United States Patent
Nair et al.

(10) Patent No.: US 9,521,113 B2
(45) Date of Patent: Dec. 13, 2016

(54) SELF-CONFIGURING LOCAL AREA NETWORK SECURITY

(71) Applicants: Jayakrishnan K. Nair, Bangalore (IN); Simon Hunt, Naples, FL (US); Prasanna Venkateswaran, Chennai (IN); Venkata Ramanan, Thanjur DIST (IN)

(72) Inventors: Jayakrishnan K. Nair, Bangalore (IN); Simon Hunt, Naples, FL (US); Prasanna Venkateswaran, Chennai (IN); Venkata Ramanan, Thanjur DIST (IN)

(73) Assignee: McAfee, Inc., Santa Clara, CA (US)

( * ) Notice: Subject to any disclaimer, the term of this patent is extended or adjusted under 35 U.S.C. 154(b) by 189 days.

(21) Appl. No.: 13/931,075

(22) Filed: Jun. 28, 2013

(65) Prior Publication Data
US 2014/0283003 A1    Sep. 18, 2014

(30) Foreign Application Priority Data
Mar. 14, 2013   (IN) .............................. 742/DEL/2013

(51) Int. Cl.
*G06F 9/00* (2006.01)
*G06F 15/16* (2006.01)
(Continued)

(52) U.S. Cl.
CPC ............... *H04L 63/02* (2013.01); *H04L 63/14* (2013.01); *H04L 63/1408* (2013.01);
(Continued)

(58) Field of Classification Search
CPC ....................................... H04L 63/14–63/1425
See application file for complete search history.

(56) References Cited

U.S. PATENT DOCUMENTS

| 8,539,582 B1 * | 9/2013 | Aziz | G06F 21/554 713/150 |
| 8,850,571 B2 * | 9/2014 | Staniford | H04L 63/1416 713/187 |

(Continued)

FOREIGN PATENT DOCUMENTS

| KR | 1020010112633 A | 12/2001 |
| KR | 1020120071864 A | 7/2012 |

OTHER PUBLICATIONS

Office Action received for Korean Patent Application No. 10-2013-116888, mailed on Aug. 28, 2014, 3 pages of English Translation and 4 pages of Korean Office Action.

(Continued)

*Primary Examiner* — Daniel Potratz
(74) *Attorney, Agent, or Firm* — Baker Botts L.L.P.

(57) ABSTRACT

Technologies for providing electronic security to a first network are disclosed. The system may include a user equipment, a gateway device configured to mediate communication between a first network and a second network for the user equipment, and an electronic security device communicatively coupled to the gateway device. The electronic security device may include a gateway interface module configured to assume an identity associated with the gateway device, a network interface module configured to present the identity to the second network, and a traffic inspection module configured to monitor traffic without substantially affecting a topology of the first network, wherein the electronic security device is configured to identify undesirable traffic; and implement a security policy.

15 Claims, 3 Drawing Sheets

(51) Int. Cl.
  *G06F 17/00* (2006.01)
  *H04L 29/06* (2006.01)
  *H04W 12/06* (2009.01)
  *H04W 12/08* (2009.01)
  *H04W 88/08* (2009.01)

(52) U.S. Cl.
  CPC .......... *H04L 63/1425* (2013.01); *H04L 63/20* (2013.01); *H04W 12/06* (2013.01); *H04W 12/08* (2013.01); *H04W 88/08* (2013.01); *H04L 63/164* (2013.01)

(56) References Cited

U.S. PATENT DOCUMENTS

| | | | |
|---|---|---|---|
| 9,027,135 B1* | 5/2015 | Aziz | H04L 63/1408 726/23 |
| 2005/0235360 A1* | 10/2005 | Pearson | H04L 29/06 726/23 |
| 2008/0222717 A1* | 9/2008 | Rothstein | H04L 63/1416 726/14 |
| 2010/0125652 A1* | 5/2010 | Rantapuska et al. | 709/222 |
| 2011/0252128 A1* | 10/2011 | Koide | H04L 63/1408 709/224 |

OTHER PUBLICATIONS

Notice of Allowance received for Korean Patent Application No. 10-2013-116888, mailed on Nov. 12, 2014, 2 pages of English Translation and 2 pages of Korean Notice of Allowance.

* cited by examiner

SELF-CONFIGURING LOCAL AREA NETWORK SECURITY

RELATED PATENT APPLICATION

This application claims the benefit of Indian Provisional Application No. 742/DEL/2013, filed Mar. 14, 2013 and entitled "SELF-CONFIGURING LOCAL AREA NETWORK SECURITY."

TECHNICAL FIELD

This disclosure relates generally to the field of electronic security and more specifically to a self-configuring home security device.

BACKGROUND

In some local area networks, such as a home network, it has become increasingly important to implement robust electronic security measures for each and every device connected to the network. The capabilities of the various devices may vary widely depending on the computational resources available to the particular device, as well as the availability of electronic security products specific to a particular device. Further, the topology of any given network may vary depending on the needs of the network's user(s). In the case of home networks, the technical savvy of the network administrator may also vary, particularly with the abilities to identity network configuration information for each device.

BRIEF DESCRIPTION OF THE DRAWINGS

For a more complete understanding of certain embodiments of the disclosure and its advantages, reference is now made to the following description, taken in conjunction with the accompanying drawings, in which.

DETAILED DESCRIPTION

As more and more information becomes available online, more users attempt to access that information in a variety of ways. The networks providing users access to the information have an interest in maintaining security of the data stored within. Additionally, users are creating their own networks of devices to access to public data networks such as the internet. These computer networks may consist of a number of electronic devices networked to one another. For example, a local area network may include a desktop computer, a laptop computer, a tablet computer, and one or more cellular telephones.

Each electronic device that is part of the computer network may require some form of electronic security protection. Traditionally, for certain types of electronic devices, this has taken the form of anti-malware products installed on the electronic device. However, the proliferation of electronic devices connected to the computer network, each with its own hardware profile, software profile, operating system, and/or other requirements, it has become increasingly complex and difficult to maintain the appropriate level of electronic security on all devices. Further, it may not be possible, feasible, or desirable to install traditional electronic security products on some types of electronic devices on a computer network. For example, the products themselves may not be advanced enough to run on an electronic device, as may be the case with certain cellular telephones. As another example, an electronic device may not be sufficiently advanced to be able to run a traditional electronic security product. Portable storage devices, for instance, do not typically include a processor required to execute traditional electronic security products.

Further, electronic security products typically require resources of the electronic device on which they are installed. This may take the form of processor time and/or power. By removing the electronic security responsibilities from the electronic device, the electronic device may see an increase in performance and/or power efficiency. One solution for providing robust electronic security to all electronic devices within a computer network may include a dedicated security device connected to the computer network.

The dedicated security device may be configured to be pluggable into an existing computer network with minimal user intervention in order to minimize the effort required to configure an electronic security program. As described in more detail below with reference to FIG. 1, the security device may be configured to take control of the network from the existing network fabric and without changing any of the network topography.

Figure 1:
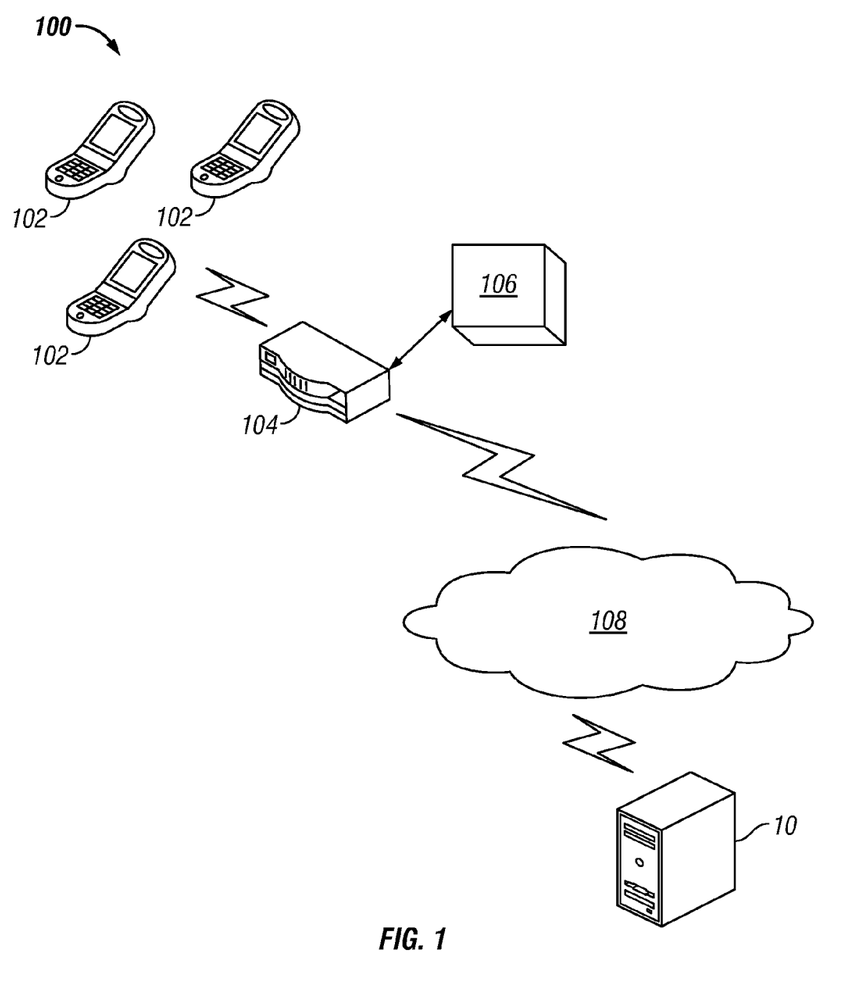
FIG. 1 illustrates an example system for implementing a self-configuring home security device, in accordance with certain embodiments of the present disclosure.

FIG. 1 illustrates an example system 100 for implementing a self-configuring home security device, in accordance with certain embodiments of the present disclosure. System 100 may include one or more user equipment 102, gateway 104, security device 106, network 108, and server 110. Although certain components of system 100 may be illustrated in FIG. 1, more, fewer, or different components may be present within security device 106 without departing from the scope of the present disclosure.

User equipment 102 may include any suitable electronic mechanism configured to allow a user access to server 110 via network 108, such as a module, server, computer, mobile device, system-on-a-chip, other electronic device, or any suitable combination of digital and analog circuitry. In some embodiments, user equipment 102 may include a processor coupled to a memory. User equipment 102 may also include instructions in memory for execution by the processor. In the same or alternative embodiments, the processor and memory may be resident on another electronic device and may execute user equipment 102 as a module.

For example, user equipment 102 may include a cellular telephone configured to access the internet. In the same or alternative embodiments, user equipment 102 may include an electronic device serving multiple users on the same device. For example, user equipment 102 may include a desktop computer in use in a home environment in which a plurality of family members have different accounts. In further same or alternative embodiments, system 100 may include a plurality of user equipment 102. In some configurations, the plurality of user equipment 102 may be networked together via wired (e.g., Ethernet), wireless (e.g., 802.11 protocols), or other appropriate networking configurations. For example, in a home environment, system 100 may include a plurality of laptop computers and a desktop computer, which several users share, sharing a home network.

As described above, user equipment 102 may include a processor and a computer-readable memory. Program instructions may be used to cause a general-purpose or special-purpose processing system that is programmed with the instructions to perform the operations described above. The operations may be performed by specific hardware components that contain hardwired logic for performing the operations, or by any combination of programmed computer components and custom hardware components. The methods described herein may be provided as a computer program product that may include one or more machine readable media having stored thereon instructions that may be used to program a processing system or other electronic device to perform the methods. The term "machine readable medium" or "computer readable medium" used herein shall include any medium that is capable of storing or encoding a sequence of instructions for execution by the machine and that cause the machine to perform any one of the methods described herein. The term "machine readable medium" shall accordingly include, but not be limited to, memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The processor may comprise, for example a microprocessor, microcontroller, digital signal processor (DSP), application specific integrated circuit (ASIC), or any other digital or analog circuitry configured to interpret and/or execute program instructions and/or process data. In some embodiments, the processor may interpret and/or execute program instructions and/or process data stored in memory. The memory may be configured in part or whole as application memory, system memory, or both. The memory may include any system, device, or apparatus configured to hold and/or house one or more memory modules. Each memory module may include any system, device or apparatus configured to retain program instructions and/or data for a period of time (e.g., computer-readable storage media). Instructions, logic, or data for user equipment 102 may reside in memory for execution by one or more processors.

The processor(s) may execute one or more code instruction(s) to be executed by the one or more cores of the processor. The processor cores may follow a program sequence of instructions indicated by the code instructions. Each code instruction may be processed by one or more decoders of the processor. The decoder may generate as its output a micro operation such as a fixed width micro operation in a predefined format, or may generate other instructions, microinstructions, or control signals which reflect the original code instruction. The processor(s) may also include register renaming logic and scheduling logic, which generally allocate resources and queue the operation corresponding to the convert instruction for execution. After completion of execution of the operations specified by the code instructions, back end logic within the processor(s) may retire the instruction. In some embodiments, the processor(s) may allow out of order execution but requires in order retirement of instructions. Retirement logic within the processor(s) may take a variety of forms as known to those of skill in the art (e.g., re-order buffers or the like). The processor cores of the processor(s) are thus transformed during execution of the code, at least in terms of the output generated by the decoder, the hardware registers and tables utilized by the register renaming logic, and any registers modified by the execution logic.

In some embodiments, gateway 104 may be configured to mediate access to network 108 for user equipment 102. For example, gateway 104 may include a cable or DSL modem, a wireless router, a network switch, and/or a wireless access point. Gateway 104 may generally be configured to allow user equipment 102 to access network 108. In some embodiments, gateway 104 may include an IP address associated with gateway 104 ("public IP address"). This IP address may be the IP address that identifies gateway 104 to other electronic devices communicating over network 108. Network 108 may be any data network accessible by user equipment 102 via gateway 104. For example, network may be the internet, an intranet, or other data network. In some embodiments, gateway 104 may be communicatively coupled to security device 106.

Security device 106 may be configured to perform various electronic security functions associated with system 100. For example, security device 106 may analyze network traffic from user equipment 102 to and/or from network 108. In some configurations, security device 106 may include electronic security products (e.g., anti-malware products), electronic security policies, etc. In the same or alternative configurations, security device 106 may include a processor and computer readable media. Program instructions may be used to cause a general-purpose or special-purpose processing system that is programmed with the instructions to perform the operations described above.

Security device 106 may also be configured to automatically integrate itself into system 100 with little to no manual assistance. In some systems 100, it may be necessary or desirable to implement a program whereby some or all of the electronic security tasks are offloaded from the individual user equipment 102 to a centralized, dedicated security device. Such a dedicated security device may be within the existing network fabric. For example, a dedicated security device could be communicatively coupled to, or integrated with, gateway 104. In such a manner, the security device may act as an electronic security gateway for all user equipment 102 by providing, for example, filtering and inspection capabilities.

However, for some operators of system 100, it may be undesirable for the operator of system 100 to configure such a security device. This configuration may include identifying the internet protocol ("IP") address of various components of system 100 such as gateway 104 and any dedicated security device. A self-configuring security device, such as security device 106, may be configured to alleviate the burden of system configuration.

In some embodiments, security device 106 may be configured to assume the identity of gateway 104 by, for example, altering the Address Resolution Protocol ("ARP") requests. Security device 106 may therefore be configured to route all originating traffic through itself. Security device 106 may then be able to inspect all such traffic and enforce a set of electronic security policies associated with such traffic. As a result of such a procedure, security device 106 may be configured to obtain the private IP address of gateway 104. By taking control of network 108 from gateway 104 in such a manner, security device 106 may be able implement an electronic security program without changing any of the existing network topography. Security device 106 may then, in some embodiments, be plugged into an existing network 108 with minimal intervention required by an operator of system 100.

Security device 106 may also be configured to obtain its own IP address on the local area network via the appropriate dynamic host configuration protocol ("DHCP") server (the "local IP address"). Security device 106 may therefore be configured to obtain an IP address valid on the local area network. Security device 106 may be further configured to connect to a security service hosted on server 110. For example, security device 106 may be configured to connect to an internet address (e.g., a webpage such as "homesecurity.mcafee.com"). Security device 106 may then report data associated with its public IP address and its local IP address.

In some embodiments, server 110 may be one or more computing devices configured to host a security service accessible by security device 106 via network 108. For example, the security service may be a web application. Once server 110 receives the local IP address data from security device 106, server 110 may make this data available via a user interface to users of user equipment 102. User equipment 102 may, for instance, be directed to an internet address (e.g., a webpage such as "homesecurity.mcafee.com"). Because security device 106 is acting as the security gateway for the local area network, the request from user equipment 102 appears to server 110 to originate from security device 106. The request may also include data associated with the public IP address of security device 106 (and therefore the public IP address of gateway 104). The security service hosted on server 110 may look up the public IP address received as part of the data request and respond to the data request with a redirect response, redirecting user equipment 102 to the local IP address associated with electronic security device 106. User equipment 102 may then be redirected to a web service running on security device 106.

Figure 2:
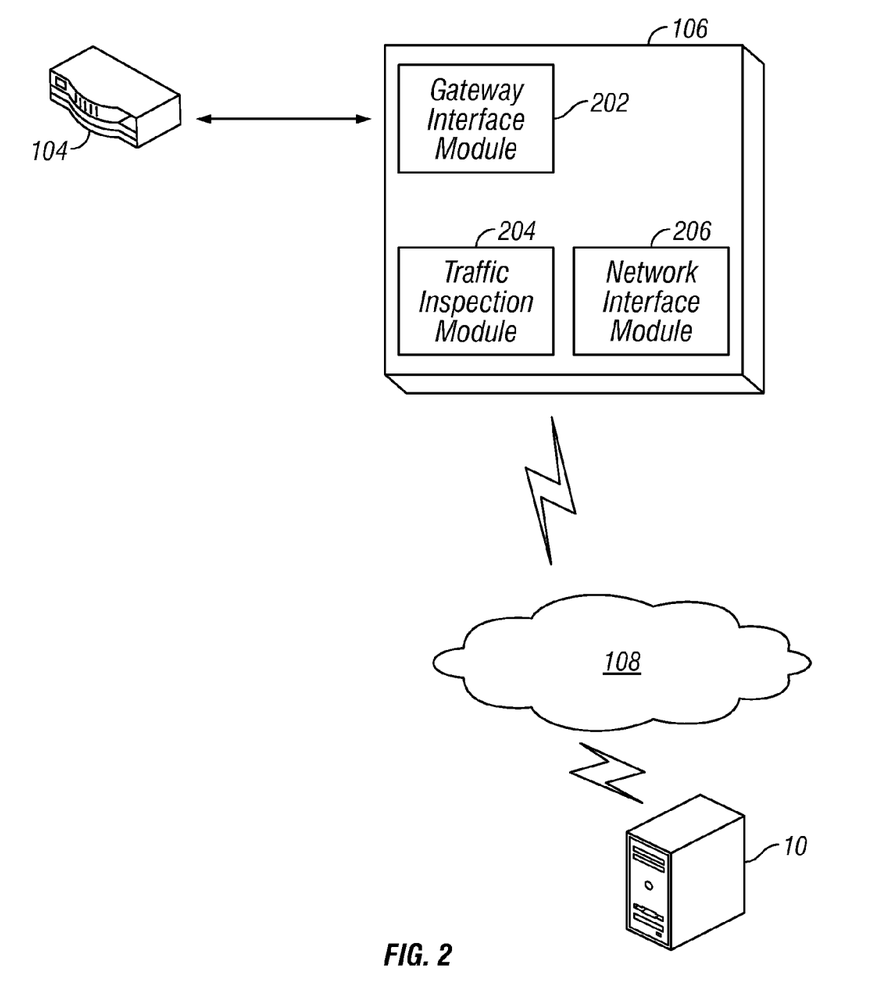
FIG. 2 illustrates an example security device, in accordance with certain embodiments of the present disclosure.

FIG. 2 illustrates an example security device 106, in accordance with certain embodiments of the present disclosure. As described in more detail above with reference to FIG. 1, security device 106 may be communicatively coupled to gateway 104 as well as communicatively coupled to server 110 via network 108. Additionally, as described in more detail above with reference to FIG. 1, security device 106 may include one or more processors communicatively coupled to memory. In some embodiments, security device 106 may include instructions stored on memory and executable by the processor. For ease of illustration, these instructions may be considered as part of gateway interface module 202, traffic inspection module 204, and network interface module 206. Although these three modules are illustrated in FIG. 2, more, fewer, or different modules may be present without departing from the scope of the present disclosure. Further, although certain features of security device 106 are described with respect to a particular module, security device 106 may implement these features in a variety of alternative arrangements as described in more detail above with reference to FIG. 1. As used in the present disclosure, a "module" may refer to any software, hardware, firmware, and/or any combination thereof configured to perform one or more operation(s) consistent with the use of the term herein.

In some embodiments, gateway interface module 202 may be configured to provide an interface between security device 106 and gateway 104. As described in more detail above with reference to FIG. 1, gateway interface module 202 may be configured to receive, alter, and/or communicate ARP requests intended for gateway 104. For example, gateway interface module 202 may be configured to obtain the private IP address of gateway 104. By assuming the identity of gateway 104, gateway interface module 202 may be configured to intercept all traffic originating from any user equipment communicatively coupled to gateway 104. Once intercepted, gateway interface module 202 may communicate the traffic to traffic inspection module 204.

In some embodiments, traffic inspection module 204 may be configured to inspect traffic originating from any user equipment communicatively coupled to gateway 104 prior to its communication to server 110 via network 108. Traffic inspection module 204 may implement any of a variety of electronic security measures, depending on the particular application. For example, traffic inspection module 204 may comprise a variety of electronic security policies specifying how particular types of traffic are to be treated, what methods are used for inspection, and/or what actions may be taken upon violation of the policies. In the same or alternative embodiments, traffic inspection module 204 may be configured to communicate with an external data source regarding electronic security measures to be implemented. For example, traffic inspection module 204 may be configured to receive updates to security policies, updated malware definitions, etc. Once a quantum of traffic has been inspected by traffic inspection module 204, the traffic may then be communicated to network interface module 206.

In some embodiments, network interface module 206 may be configured to communicate inspected traffic to server 110 via network 108. For example, network interface module 206 may be configured to present the public IP address of gateway 104 to network 108.

Figure 3:
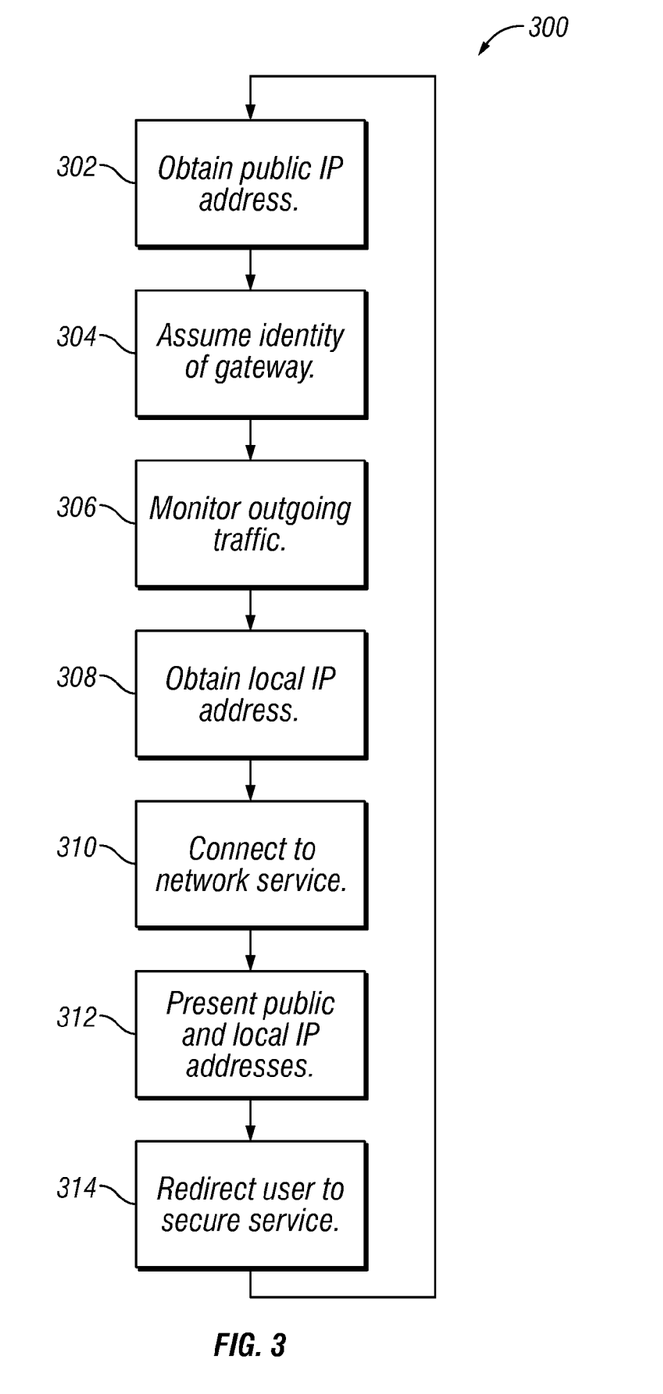
FIG. 3 is a flowchart of an example method for implementing a self-configuring home security device, in accordance with certain embodiments of the present disclosure.

FIG. 3 is a flowchart of an example method 300 for implementing a self-configuring home security device, in accordance with certain embodiments of the present disclosure. Method 300 includes acquiring the public IP address of gateway 104, modifying the ARP requests, monitoring outgoing traffic, acquiring a local IP address, and displaying the public and local IP addresses.

According to one embodiment, method 300 preferably begins at 302. Teachings of the present disclosure may be implemented in a variety of configurations. As such, the preferred initialization point for method 300 and the order of 302-314 comprising method 300 may depend on the implementation chosen.

At 302, security device 106 may obtain the private IP address of gateway 104, as described in more detail above with reference to FIGS. 1-2. After obtaining the public IP address, method 300 may proceed to 304. At 304, security device 106 may assume the identity of gateway 104 by, for example, modifying the ARP requests, as described in more detail above with reference to FIGS. 1-2. After assuming the identity of gateway 104, method 300 may proceed to 306.

At 306, method 300 may begin monitoring outgoing traffic in accordance with a set of security policies, as described in more detail above with reference to FIGS. 1-2. Once traffic monitoring has commenced, method 300 may proceed to 308.

At 308, method 300 may obtain a local IP address for security device 106. For example, security device 106 may be configured to obtain its own IP address on the local area network via the appropriate DHCP server. Once this local IP address has been obtained, method 300 may proceed to 310. At 310, security device 106 may connect to a network service and report data associated with the public IP address and local IP address to the network service. After reporting this data, method 300 may proceed to 312.

At 312, method 300 may present the public IP address and local IP address to a user through a direct or indirect means. In some embodiments, the public and local IP address information may be communicated to a remote server such as server 110. For example, user equipment 102 may request information (such as a webpage) from server 110. User equipment 102 may then be directed by server 110 to an internet address (e.g., a webpage such as "homescurity.mcafee.com"). Because security device 106 is installed between gateway 104 and network 108 and is therefore acting as the security gateway for the local area network, the request from user equipment 102 appears to server 110 to originate from security device 106.

After presenting the IP address information, method 300 may proceed to 314. At 314, method 300 may redirect user equipment 102 to a secure service. For example, based on the received information regarding the public IP address and local IP address of electronic device 102, user equipment 102 may then be redirected to a web service running on security device 106. After redirecting the user to a secure service (for example, after the expiration of a session based on credentials, time, etc.), method 300 may return to 302.

Although FIG. 3 discloses a particular set of actions to be taken with respect to method 300, method 300 may be executed with more or fewer actions than those depicted in FIG. 3. In addition, although FIG. 3 discloses a certain order with respect to method 300, method 300 may be completed in any suitable order. For example, in the embodiment of method 300 shown, security device 106 obtains a local IP address after it begins monitoring traffic. However, in some configurations it may be necessary or desirable for security device 106 to obtain the local IP address before monitoring begins.

A system for providing electronic security to a first network is disclosed. The system may include a user equipment configured to access the first network and a second network; a gateway device configured to mediate communication between the first network and the second network for the user equipment; and an electronic security device communicatively coupled to the gateway device. The electronic security device may include a gateway interface module configured to assume an identity associated with the gateway device; and a network interface module configured to present the identity to the second network. The traffic inspection module may be configured to monitor traffic from the first network to the second network without substantially affecting a topology of the first network, wherein the electronic security device is configured to identify undesirable traffic; and implement a security policy, the security policy comprising instructions for handling the undesirable traffic.

The gateway interface module may be further configured to alter an Address Resolution Protocol ("ARP") request. The gateway interface module may be configured to assume the identity associated with the gateway device by obtaining a private IP address associated with the gateway device. The gateway interface module may be further configured to obtain a local IP address associated with the first network; and the network interface module may be further configured to communicate data associated with the local IP address and data associated with the public IP address to the user equipment. The electronic security device may further include a web service, wherein the web service is configured to provide the user equipment with access to the data associated with the local IP address and the data associated with the public IP address.

An electronic security device for providing electronic security to a first network is disclosed. The electronic security device may include a gateway interface module configured to assume an identity associated with a gateway device communicatively coupled to the electronic security device and configured to mediate communication between the first network and a second network; a network interface module configured to present the identity to the second network; and a traffic inspection module. The traffic inspection module may be configured to: monitor traffic from the first network to the second network without substantially affecting a topology of the first network, wherein the electronic security device is configured to identify undesirable traffic; and implement a security policy, the security policy comprising instructions for handling the undesirable traffic. The gateway interface module may be further configured to alter an Address Resolution Protocol ("ARP") request. The gateway interface module may be configured to assume the identity associated with the gateway device by obtaining a public IP address associated with the gateway device. The gateway interface module may be further configured to obtain a local IP address associated with the first network; and the network interface module is further configured to communicate data associated with the local IP address and data associated with the public IP address to a user equipment associated with the first network. The electronic security device may further include a web service, wherein the web service may be configured to provide the user equipment with access to the data associated with the local IP address and the data associated with the public IP address.

At least one machine readable storage medium is disclosed. The medium may include computer-executable instructions carried on the computer readable medium, the instructions readable by a processor. The instructions, when read and executed, may cause the processor to assume an identity associated with a gateway device, the gateway device configured to mediate communication between a first network and a second network, present the identity to the second network, monitor traffic from the first network to the second network without substantially affecting a topology of the first network, wherein the electronic security device is configured to identify undesirable traffic, and implement a security policy, the security policy comprising instructions for handling the undesirable traffic. The medium may also include altering an Address Resolution Protocol ("ARP") request. Assuming the identity associated with the gateway device may include obtaining a public IP address associated with the gateway device.

The medium may also include obtaining a local IP address associated with the first network; and communicating data associated with the local IP address and data associated with the public IP address to a user equipment associated with the first network. The medium may also include providing the user equipment with access to the data associated with the local IP address and the data associated with the public IP address.

A method for providing electronic security to a first network is disclosed. The method includes assuming an identity associated with a gateway device, the gateway device configured to mediate communication between the first network and the second network; presenting the identity to the second network; monitoring traffic from the first network to the second network without substantially affecting a topology of the first network, wherein the electronic security device is configured to identify undesirable traffic; and implement a security policy, the security policy comprising instructions for handling the undesirable traffic. The method may also include altering an Address Resolution Protocol ("ARP") request. Assuming the identity associated with the gateway device may include obtaining a public IP address associated with the gateway device.

The method may also include obtaining a local IP address associated with the first network; and communicating data associated with the local IP address and data associated with the public IP address to a user equipment associated with the first network. The method may also include providing the user equipment with access to the data associated with the local IP address and the data associated with the public IP address.

What is claimed:

1. An electronic security device for providing electronic security to a first network, the electronic security device comprising:
   a processor;
   a gateway interface module comprising instructions, when loaded and executed by the processor, configured to assume an identity of a gateway device communicatively coupled to the electronic security device and configured to mediate communication between the first network and a second network, wherein assuming the identity of the gateway device is performed by altering an Address Resolution Protocol;
   a network interface module comprising instructions, when loaded and executed by the processor, configured to present the identity to the second network;
   a traffic inspection module comprising instructions, when loaded and executed by the processor, configured to:
      monitor traffic from the first network to the second network without substantially affecting a topology of the first network, wherein the electronic security device is configured to identify undesirable traffic; and
      implement a security policy, the security policy comprising instructions for handling the undesirable traffic;
   wherein the electronic security device is:
      communicatively coupled to the first network and to the second network through the gateway device;
      resident in the first network with the gateway device; and
      configured to, through the gateway device, present the identity to the second network, monitor traffic from the first network to the second network, and implement the security policy.

2. The electronic security device of claim 1, wherein the gateway interface module is further configured to alter an Address Resolution Protocol ("ARP") request.

3. The electronic security device of claim 1, wherein the gateway interface module is configured to assume the identity of the gateway device by obtaining a public IP address associated with the gateway device.

4. The electronic security device of claim 3, wherein:
   the gateway interface module is further configured to obtain a local IP address associated with the first network; and
   the network interface module is further configured to communicate data associated with the local IP address and data associated with the public IP address to a user equipment associated with the first network.

5. The electronic security device of claim 4, wherein the electronic security device further comprises a web service, wherein the web service is configured to provide the user equipment with access to the data associated with the local IP address and the data associated with the public IP address.

6. At least one non-transitory machine readable storage medium, comprising computer-executable instructions carried on the machine readable storage medium, the instructions readable by a processor incorporated by an electronic security device, the instructions, when read and executed, causing the electronic security device to:
   assume an identity of a gateway device communicatively coupled to the electronic security device and resident in a same first network as the electronic security device, the gateway device configured to mediate communication between the first network and a second network, wherein assuming the identity of the gateway device is performed by altering an Address Resolution Protocol;
   present the identity to the second network;
   monitor traffic from the first network to the second network without substantially affecting a topology of the first network, wherein the electronic security device is configured to identify undesirable traffic; and
   implement a security policy, the security policy comprising instructions for handling the undesirable traffic;
   wherein the electronic security device is communicatively coupled to the first network and to the second network through the gateway device; and
   wherein the electronic security device is caused to, through the gateway device, present the identity to the second network, monitor traffic from the first network to the second network, and implement the security policy.

7. The medium of claim 6, further comprising machine executable instructions for causing the processor to alter an Address Resolution Protocol ("ARP") request.

8. The medium of claim 6, wherein assuming the identity of the gateway device comprises obtaining a public IP address associated with the gateway device.

9. The medium of claim 8, further comprising machine executable instructions for causing the processor to:
   obtain a local IP address associated with the first network; and
   communicate data associated with the local IP address and data associated with the public IP address to a user equipment associated with the first network.

10. The medium of claim 9, further comprising machine executable instructions for causing the processor to provide the user equipment with access to the data associated with the local IP address and the data associated with the public IP address.

11. A method for providing electronic security to a first network, the method comprising:
   assuming, by an electronic security device, an identity of a gateway device communicatively coupled to the electronic security device and resident in the same first network as the electronic security device, the gateway device configured to mediate communication between the first network and a second network, wherein assuming the identity of the gateway device is performed by altering an Address Resolution Protocol;
   presenting, by the electronic security device, the identity to the second network;
   monitoring, by the electronic security device, traffic from the first network to the second network without substantially affecting a topology of the first network, wherein the electronic security device is configured to identify undesirable traffic; and
   implementing, by the electronic security device, a security policy, the security policy comprising instructions for handling the undesirable traffic;
   wherein the electronic security device is communicatively coupled to the first network and to the second network through the gateway device; and
   wherein presenting the identity to the second network, monitoring traffic from the first network to the second network, and implementing the security policy is performed through the gateway device.

12. The method of claim 11, further comprising altering an Address Resolution Protocol ("ARP") request.

13. The method of claim 11, wherein assuming the identity of the gateway device comprises obtaining a public IP address associated with the gateway device.

14. The method of claim 13, further comprising
obtaining a local IP address associated with the first network; and
communicating data associated with the local IP address and data associated with the public IP address to a user equipment associated with the first network.

15. The method of claim 14, further comprising providing the user equipment with access to the data associated with the local IP address and the data associated with the public IP address.

* * * * *